(12) United States Patent
Bechtler et al.

(10) Patent No.: US 9,205,878 B2
(45) Date of Patent: Dec. 8, 2015

(54) TUNNEL ARRANGEMENT FOR A FLOOR ASSEMBLY OF A VEHICLE BODY, AND A FLOOR ASSEMBLY

(71) Applicant: Dr. Ing. h.c. F. Porsche Aktiengesellschaft, Stuttgart (DE)

(72) Inventors: Frank Bechtler, Stuttgart (DE); Pawel Adamski, Wildberg (DE); Robert Koehr, Neustadt (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 14/253,046

(22) Filed: Apr. 15, 2014

(65) Prior Publication Data

US 2014/0306485 A1    Oct. 16, 2014

(30) Foreign Application Priority Data

Apr. 15, 2013    (DE) .......................... 10 2013 103 729

(51) Int. Cl.
*B62D 25/20* (2006.01)
*B62D 29/00* (2006.01)

(52) U.S. Cl.
CPC .............. *B62D 29/008* (2013.01); *B62D 25/20* (2013.01)

(58) Field of Classification Search
CPC ........................................................ B62D 25/20
USPC ........................................ 296/187.08, 193.07
See application file for complete search history.

(56) References Cited

U.S. PATENT DOCUMENTS

| | | | |
|---|---|---|---|
| 2005/0211496 A1* | 9/2005 | Ito et al. | ........................ 180/314 |
| 2006/0055207 A1 | 3/2006 | Reinhardt | |
| 2010/0026046 A1 | 2/2010 | Mendoza et al. | |
| 2012/0212009 A1* | 8/2012 | Ishizono et al. | ......... 296/193.07 |
| 2014/0333056 A1* | 11/2014 | Yoshida et al. | ............... 280/834 |

FOREIGN PATENT DOCUMENTS

| | | |
|---|---|---|
| DE | 41 39 331 | 6/1992 |
| DE | 102 60 393 | 1/2004 |
| DE | 103 09 624 | 9/2004 |
| DE | 10 2004 026 299 | 12/2005 |
| DE | 10 2009 057 986 | 6/2011 |
| DE | 10 2012 102 447 | 9/2013 |
| EP | 2 096 020 | 9/2009 |

OTHER PUBLICATIONS

German Search Report of Jan. 7, 2014.

* cited by examiner

*Primary Examiner* — H Gutman
(74) *Attorney, Agent, or Firm* — Gerald E. Hespos; Michael J. Porco; Matthew T. Hespos

(57) ABSTRACT

A tunnel arrangement for a floor assembly of a vehicle body is proved. The floor assembly includes spaced apart first and second floor parts. A tunnel is arranged between the first and second floor parts and includes first and second flanges and front and rear tunnel sections extending between the first and second flanges. A tunnel bridge is provided on a lower surface of the tunnel for stiffening the tunnel arrangement.

7 Claims, 2 Drawing Sheets

TUNNEL ARRANGEMENT FOR A FLOOR ASSEMBLY OF A VEHICLE BODY, AND A FLOOR ASSEMBLY

CROSS REFERENCE TO RELATED APPLICATION

This application claims priority under 35 USC 119 to German Patent Appl. No. 10 2013 103 729.1 filed on Apr. 15, 2013, the entire disclosure of which is incorporated herein by reference.

BACKGROUND

1. Field of the Invention

The invention relates to a tunnel arrangement for a floor assembly of a vehicle body, having front and rear tunnel sections. The invention also relates to a floor assembly having such a tunnel arrangement.

2. Description of the Related Art

Floor assemblies with tunnel arrangements are well known. The floor assembly is part of the vehicle body and includes a floor front part, a floor central part and a floor rear part. DE 10 2009 057 986 A1 discloses a floor assembly where the floor central part is formed as a rolled profile and has a tunnel arrangement that is an integral constituent part. The tunnel arrangement functions to receive engine components or parts such as a drive shaft or a cooling water hose arrangement to guide these parts between the front and rear ends of the vehicle. A floor assembly of this type can be produced in a simple and inexpensive manner, but is bound to a particular vehicle type, and the associated vehicle length due to the spacing between the front and rear axles.

It is therefore an object of the invention to provide a tunnel arrangement and a floor assembly that eliminate the above-mentioned disadvantage and that can be produced in a simple and inexpensive manner.

SUMMARY OF THE INVENTION

The object is achieved by a tunnel bridge that increases stiffness. The front tunnel section preferably is produced from sheet-metal shell parts and the rear tunnel section is produced from a casting. More particularly, the front tunnel section preferably is produced from sheet-aluminum shell parts and the rear tunnel section preferably is produced as an aluminum pressure die casting.

For simple assembly, the rear tunnel section may have a connecting flange element for the front tunnel section. The rear tunnel section also may have a fastening element for a chassis control unit.

The tunnel bridge advantageously is produced from an extruded aluminum profile.

The tunnel bridge also may have two rectangular base parts that are connected to one another by web parts arranged in an X-shape.

The invention also relates to a floor assembly having the above-described tunnel arrangement. The floor assembly has floor parts connected to the tunnel arrangement via flanges. To ensure high stiffness and an optimum introduction of force into the vehicle body in the event of a side-on impact, the flange parts preferably run out at an angle α with respect to the tunnel arrangement. The angle α advantageously is between 10° and 70°.

The invention is explained in more detail below on the basis of the drawings.

DETAILED DESCRIPTION OF THE PREFERRED EMBODIMENT

Figure 1:
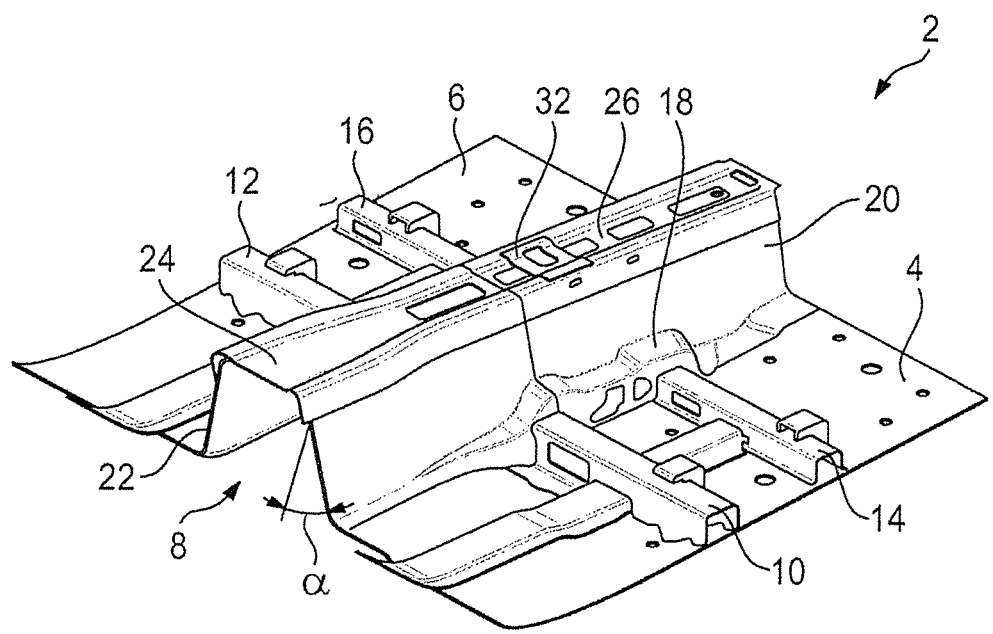
FIG. 1 is a perspective view of a floor assembly of a vehicle body.

FIG. 1 is a perspective view of a floor assembly 2. The floor assembly 2 comprises floor parts 4, 6 that are arranged to the sides of a tunnel arrangement 8. In a known way, the floor parts 4, 6 have front seat cross members 10, 12 and rear seat cross members 14, 16. Furthermore, reinforcement elements 18 are provided. In a known way, the floor parts 4, 6 are connected to the tunnel arrangement 8 via single-piece or multi-piece flanges 20, 22. In the present exemplary embodiment, the flanges 20, 22 are of single-piece form. The flanges 20, 22 are arranged at an angle to the tunnel arrangement 8 so that the flange parts run out from the tunnel arrangement 8 at an angle α to the vertical. In this way, stiffness is significantly increased with regard to a side-on impact against the motor vehicle. In the present embodiment, the angle α is approximately 30°.

The tunnel arrangement is composed of a front tunnel section 24, a rear tunnel section 26 and a tunnel bridge 28 (FIG. 2). The front tunnel section 24 and the rear tunnel section 26 are arranged on the tunnel bridge 28 so that a continuous tunnel arrangement is provided. In this embodiment, the front tunnel section 24 is composed of sheet-aluminum shell parts, and the rear tunnel section 26 is composed of an aluminum pressure die casting. The rear tunnel section 26 has a connecting flange element 30 (see FIG. 2) which is in the form of a double-shear connection and onto which the front tunnel section 24 is mounted. Reference sign 32 denotes a fastening element for a chassis control unit (not illustrated in any more detail).

Figure 2A:
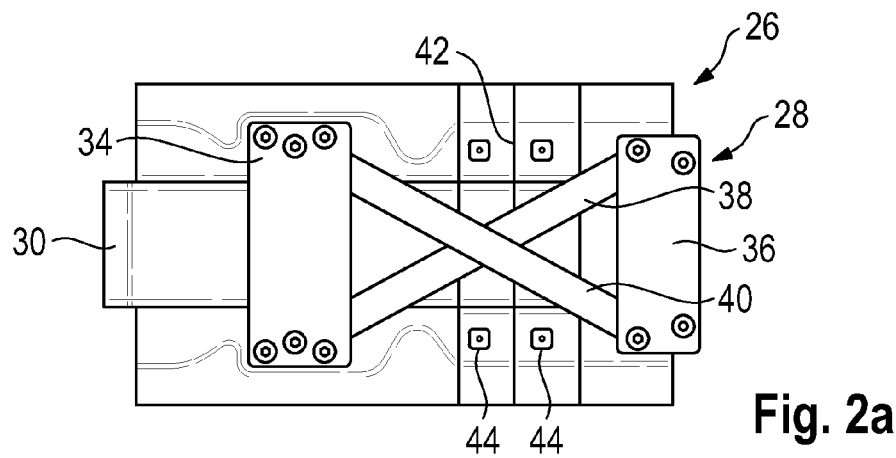
FIGS. 2a-2c are a view from below of tunnel arrangements for the floor assembly of FIG. 1.
Figure 2B:
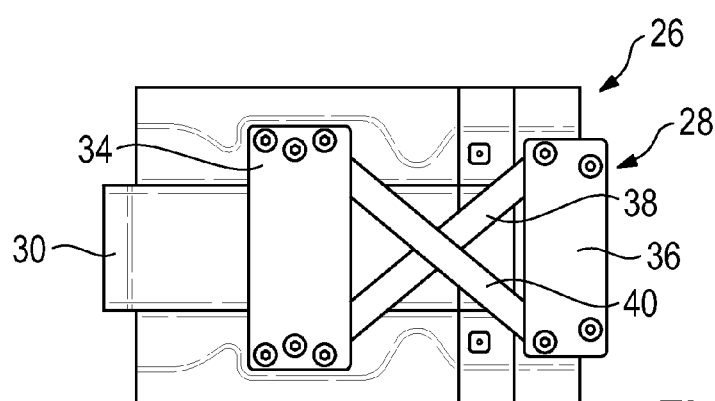
Figure 2C:
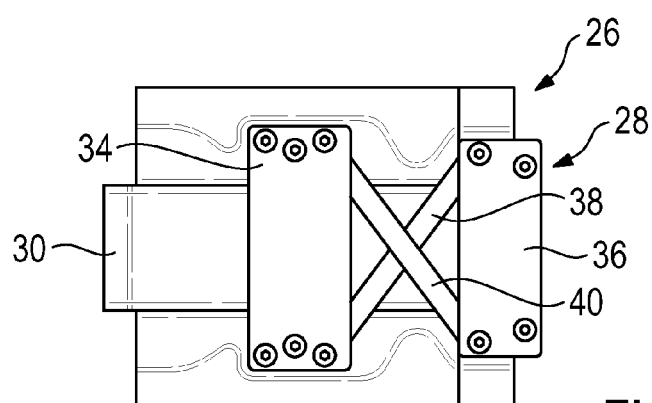

FIGS. 2a, 2b and 2c show view from below of embodiments of the rear tunnel section 26 with the tunnel bridge 28. The tunnel bridge 28 functions to stiffen the rear tunnel section 26 and thus to stiffen the tunnel arrangement 8 as a whole. As can be seen from FIGS. 2a, 2b and 2c, the tunnel bridge 28 is composed of two rectangular base parts 34, 36 that are connected to one another by web parts 38, 40 arranged in an X-shape. In this way, in the non-installed state, the tunnel bridge 28 can be pulled apart or pushed together in the manner of an accordion, and can in this way be adapted to different lengths of the rear tunnel section. Accordingly, FIG. 2a shows a rear tunnel section 26 composed of an aluminum pressure die casting that is used in non-shortened form, FIG. 2b shows a rear tunnel section 26 composed of an aluminum pressure die casting that has been shortened in relation to the aluminum pressure die casting from FIG. 2a, and FIG. 2c shows the shortest embodiment of a rear tunnel section 26. Here, the original aluminum pressure die casting from FIG. 2a should have all of the fastening surfaces 42 and openings 44 for all variants.

What is claimed is:

1. A tunnel arrangement for a floor assembly of a vehicle body, the floor assembly having first and second floor parts spaced from each other, the tunnel arrangement comprising:
    a downwardly concave front tunnel section formed from at least one sheet-metal part and having opposite first and second front section flanges connected respectively to the first and second floor parts;

a downwardly concave rear tunnel section having opposite first and second rear section flanges extending rearward of the respective first and second front section flanges and connected respectively to the first and second floor parts, the rear tunnel section being a die casting and formed with a first front fastening surface and a second front fastening surface respectively on the first and second rear section flanges at positions in proximity to the front tunnel section and a plurality of first rear fastening openings on the first rear section flange at a plurality of distances rearward from the first front fastening surface and a plurality of second rear fastening openings on the second rear section flange at a plurality of distances rearward from the second front fastening surface; and a tunnel bridge for increasing stiffness of at least the rear tunnel section, the tunnel bridge including a front base part mounted to and extending between the first and second front fastening surfaces, a rear base part mounted to and extending between one of the first rear fastening openings and one of second rear fastening openings and two web parts arranged in an X-shape and extending between the front and rear base parts.

2. The tunnel arrangement of claim 1, wherein the front tunnel section comprises at least one sheet-aluminum shell part and the rear tunnel section is an aluminum pressure die casting.

3. The tunnel arrangement of claim 1, wherein the rear tunnel section has a connecting flange element connected to the front tunnel section.

4. The tunnel arrangement of claim 1, wherein the rear tunnel section has a fastening element for a chassis control unit.

5. The tunnel arrangement of claim 1, wherein at least a part of the tunnel bridge is an extruded aluminum profile.

6. The tunnel arrangement of claim 1, wherein the flange parts run at an angle with respect to the tunnel arrangement and are at an angle α to vertical.

7. The tunnel arrangement of claim 6, wherein the angle α is between 10° and 70°.

* * * * *